June 13, 1967      J. P. McANDREW      3,324,830
ANTI-CREEP ADAPTER FOR MILKING MACHINE INFLATIONS
Filed Jan. 27, 1966      2 Sheets-Sheet 1

INVENTOR
James P. McAndrew

BY Gardner J. O'Boyle
ATTORNEY

June 13, 1967   J. P. McANDREW   3,324,830
ANTI-CREEP ADAPTER FOR MILKING MACHINE INFLATIONS
Filed Jan. 27, 1966   2 Sheets-Sheet 2
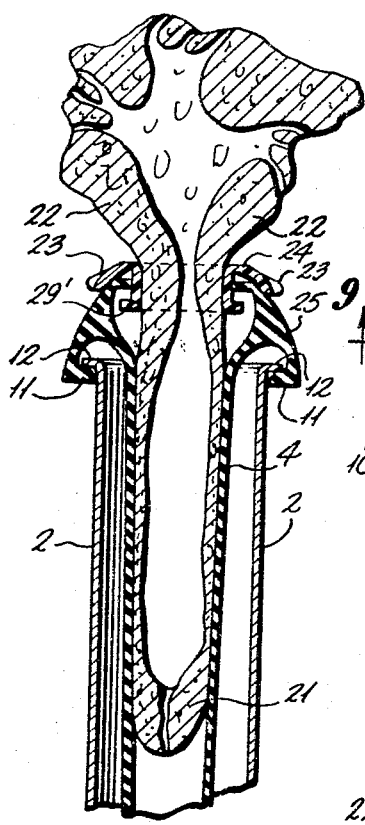
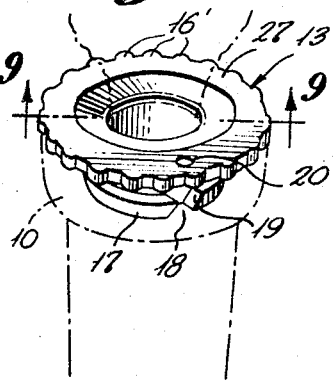
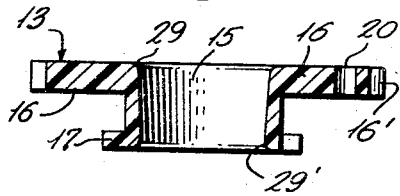
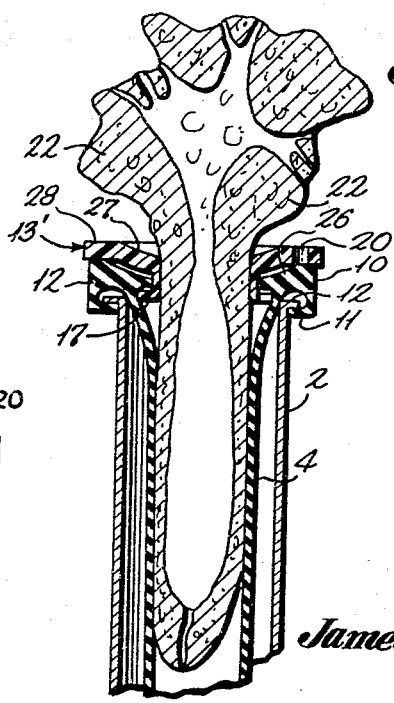
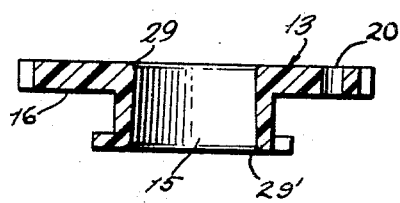
INVENTOR
*James P. McAndrew*
BY *Gardner J. O'Boyle*
ATTORNEY

United States Patent Office 3,324,830
Patented June 13, 1967

3,324,830
ANTI-CREEP ADAPTER FOR MILKING
MACHINE INFLATIONS
James P. McAndrew, Lake Ariel, Pa. 18436
Filed Jan. 27, 1966, Ser. No. 535,269
9 Claims. (Cl. 119—14.52)

This invention relates to teat cup inflations of the character employed with milking machines, and more particularly to an anti-creep adapter for use with teat cup inflations.

Conventional teat cup inflations are basically of three general types, comprising numerous modifications with respect to linear dimensions, bore diameters, configuration of the body portions, and nature of the material from which they are formed; the three currently popular designs are classified according to the configuration of their top portion, namely, concave or dished, convex or dome, and flat dome.

While the heretofore suggested teat cup inflations of the above-noted types no doubt function for their intended purposes, they are open to certain objections due to their respective inherent design. The concave or dished top type contributes to the shutting off of the milk flow by reason of the fact that the upper edge of the rim portion thereof terminates in a plane above the inwardly projecting flange or ring member located in the vicinity of the top of the inflation, which member is designed to effect a vacuum seal. Additionally, the concave top actually serves as a receptacle into which foreign materials may collect, and eventually gravitate into the milk tube itself. Since the dished portion of the inflation extends downwardly within the upper rim or edge of the metal shell, and since the intersection of the dished part of the inflation with its upper body portion is defined by a circumferential rigid lip for sealing the vacuum, the shell inerfaces with expansion and contraction of the inflation, thus impeding effective sealing of the vacuum. In using this type of inflation, with cows having small teats, since the dished portion provides the vacuum seal, it must be placed high enough on a small teat to engage the lower part of the udder; consequently, a small portion of the udder is drawn tightly against the inflation with resultant reduction in the flow of milk or even complete shut off thereof.

The convex or dome type inflation does not have a large enough area of contact with the cow's teat for optimum and proper massaging of the teat, and to prevent creeping of the inflation. The only part of the convex or dome type inflation that is in close contact with the top portion of the teat is the inner circumference of the teat receiving orifice. Accordingly, this arrangement is a contributing factor in the upward creeping movement of the inflation which, in turn, tends to shut off the milk flow. The concave or dished and the dome type inflations are similarly deficient, in that they do not have sufficient area of contact with the teat for proper massage, and to provide an effective vacuum seal; additionally, the relatively small area of contact permits the inflation to creep upwardly on the teat and interfere with the milk flow.

In order to overcome the deficiencies of the above noted conventional type inflations, with respect to upward creeping movement on the cow's teat, various solutions have heretofore been suggested, some of which involve modification of the head or top portion of the inflation to reinforce the same by increasing the thickness of the walls, or by means of a sleeve or the like, positioned on the upper portion of the inflation below the entrance opening, and between the inflation and steel shell. These modified arrangements no doubt reduce the tendency of the inflation to interfere with the normal flow of milk during the milking operation; however, it will be appreciated that the expense incident to the replacement of the conventional or standard inflations currently employed by the dairyman may not be found economically feasible. In this regard, replacement of the conventional inflations is not limited to a set of uniform size; in view of the well known variation in teat dimensions, several inflations having top openings of specifically different inside diameters are needed, thus increasing the initial replacement costs. Additionally, substitution of one modified inflation for another of a different diameter cannot be accomplished without removing the inflation from the steel shell. Removal of an inflation from the shell is not only time consuming, but also distracts the herdsman's attention from the performance of other duties necessary for efficient operation of the milking system.

As the result of considerable research and experimentation, I have found that the deficiencies of a conventional or standard teat cup inflation, with respect to upward creeping on a cow's teat so as to interfere with or completely shut off the flow of milk, can be overcome by anti-creep means comprising a fitting or adapter designed for ready attachment to and removal from the upper section of the inflation. More particularly, the improved anti-creep adapter of the present invention comprises, essentially, a tubular body or neck portion having a flange at each end thereof, each of the flanges having an opening therein coinciding and concentric with the opening in the tubular body, one of said flanges being of larger diameter than the other, the smaller flange, which constitutes the means for attaching the adapter to the inflation, being constructed and arranged for easy insertion and removal from the teat receiving opening of the teat cup rubber inflation, in situ.

An object of the invention is to provide an improved anti-creep adapter for use with teat cup inflations of the character employed with milking machines.

Another object of the invention is to provide an improved anti-creep adapter, for use with teat cup inflations, designed to minimize or prevent upward movement of the inflations on the cow's teats, during the milking process, and thereby interfere with normal, free flow of milk.

Yet another object of the invention is to provide an improved anti-creep adapter, for use with teat cup inflations, having a relatively large area of contact with the cow's teat whereby to insure optimum and proper massaging of the teat during the milking process.

Still another object of the invention is to provide an improved anti-creep adapter, for use with teat cup inflations, constructed and arranged for ready attachment to and removal from the inflation without loosening or removing the inflation from its associated rigid shell.

A further object of my invention is to provide an anti-creep adapter, for use with teat cup inflations, formed from a suitable plastic characterized by a relatively low coefficient of friction and anti-stick properties.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which, for the purpose of explanation, have been made the subject of illustration.

In the drawings:

FIGURE 7 is a sectional view along line 7—7 of FIGURE 6, including a partial sectional view of a cow's udder, showing the teat cup inflation and associated anti-creep adapter of FIGURE 5 in the operative position;

FIGURE 8 is a perspective view of an anti-creep adapter having a concave top portion;

FIGURE 9 is a sectional view along line 9—9 of FIGURE 8, including a partial sectional view of a cow's udder, showing a teat cup inflation having a concave top portion and associated anti-creep adapter in the operative position;

FIGURE 10 is a central vertical sectional view of an anti-creep adapter having a downwardly tapered bore; and FIGURE 11 is a view similar to FIGURE 10, of an anti-creep adapter having an upwardly tapered bore.

Figure 1:
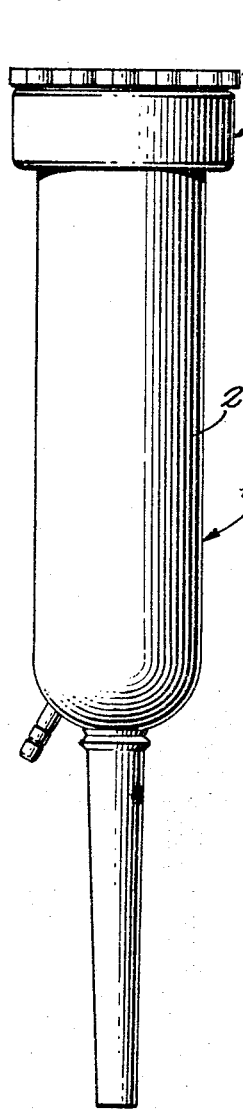
FIGURE 1 is an elevational view of a flat top teat cup inflation and shell, equipped with an anti-creep adapter of the present invention.
Figure 2:
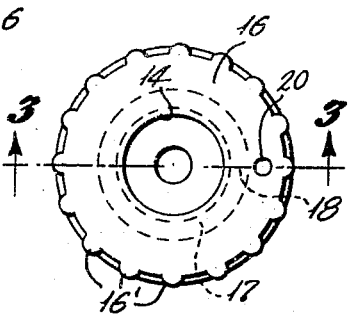
FIGURE 2 is a top plan view of the teat cup inflation of FIGURE 1.

Referring to the drawings, and more particularly to FIGURES 1–4, there is shown a teat cup, designated generally by numeral 1, comprising a rigid shell 2, having a nipple 3 adapted to be connected to a hose of a pulsator, not shown, of the character employed with a conventional milking machine, and a flexible inflation 4 positioned within the shell, said inflation having a milk tube portion 5 at one end thereof, and an integral collar 6 at its opposite end. As will be seen in FIGURE 3, the collar is formed with a top portion 7 provided with a teat receiving opening 8, defining an internal flange 9 having a relatively narrow edge 9', and a skirt portion 10 having an inwardly projecting peripheral lip 11 adapted to seat beneath a circumferential bead 12 formed on the upper end of the shell.

Figure 4:
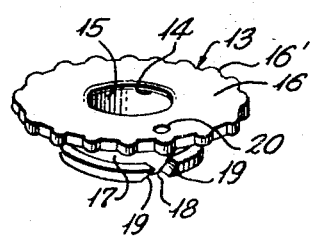
FIGURE 4 is a perspective view of the anti-creep adapter used with the teat cup inflation of FIGURE 1.

The anti-creep adapter 13 of the present invention, FIGURE 4, comprises a cylindrical shaped body 14 having a central bore 15, said body portion terminating in an upper circular flange 16 constituting the head portion of the adapter, and a lower circular flange 17 constituting the foot portion, the lower flange being formed with a peripheral notch 18 having angularly disposed walls defining lip portions 19, adapted for cooperative engagement with the flange 9 of the inflation, as will be described more fully hereinafter. The peripheral portion of the upper flange 16 of the adapter is serrated, as at 16', to provide a gripping surface, and is further provided with a slight opening 20 in radial alignment with the notch 18, whereby the location of the notch with respect to the flange 9 can be visually determined, when the adapter is in seated, operative position on the inflation.

While the adapter may be formed from any suitable material, it is preferably formed from a plastic characterized by its relatively low coefficient of friction and anti-stick properties such as polyethylene or the like, or tetrafluorethylene, the latter product sold under the trademark Teflon.

It will be appreciated that conventional rubber inflations of the type referred to hereinabove are friction-producing by nature, and accordingly, due to the suction applied thereto to withdraw milk, the inflations tend to creep upwardly of the cow's teats and eventually close the milk canals, with resultant stoppage of the flow of milk. Reference again being had to FIGURE 3 of the drawings, it will be noted that the relatively narrow peripheral edge 9' of the flange 9 of the inflation is in sealing engagement with the lateral surface of the body or neck portion 14 of the adapter; as a consequence, vertical movement of the flange 9 is restricted to the distance between the upper and lower flanges 16 and 17, respectively, of the adapter. It will thus be seen that the peripheral edge 9' is maintained out of contact with the upper portion of the teat 21 in the vicinity of the root or juncture with the udder 22, thus preventing radial pressure developed in the flange, which pressure would be traumatic to the secretory milk tissue, from being transmitted to the teat.

A concomitant and important feature of the adapter construction of the present invention is the provision of the relatively large area of contact between the inner surface of the cylindrical body or neck portion 14 and the teat when the adapter is in the operative position thereon. As the result of the increased area of contact, as compared with a conventional inflation, stimulation of the cow to let down her milk is appreciably increased; and the teat is massaged extremely well by the pulsations of the milking machine, because of the low coefficient of friction of the plastic from which the adapter is formed.

Among other features of advantage accruing from the increased area of contact of the adapter with the cow's teat are: a substantial reduction in the tendency of the inflation to "blow," thus reducing the vacuum throughout the milking system; maintenance of a tight vacuum seal on each inflation of each milking unit, whereby to provide a substantially steady flow in all milking units on the vacuum line; and a marked reduction in the possibility of the teat being flexed by movement of the cow or the milking unit, so as to retard or shut off the flow of milk.

Figure 5:
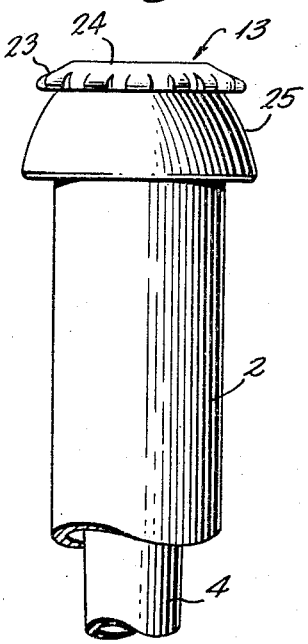
FIGURE 5 is an elevational view of a dome type teat cup inflation and shell, equipped with a modified anti-creep adapter.
Figure 3:
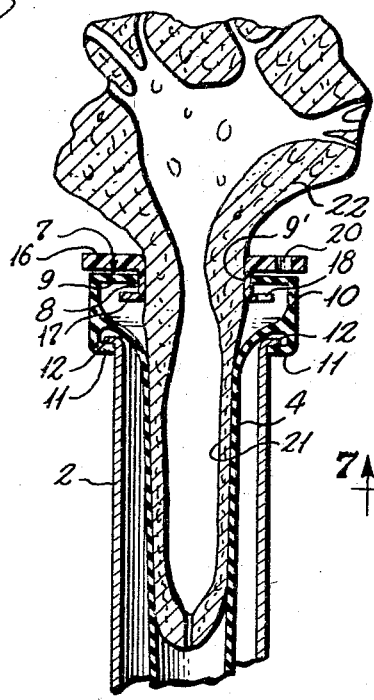
FIGURE 3 is a sectional view along line 3—3 of FIGURE 2, and including a partial sectional view of a cow's udder, showing the teat cup inflation and associated adapter in the operative position.
Figure 6:
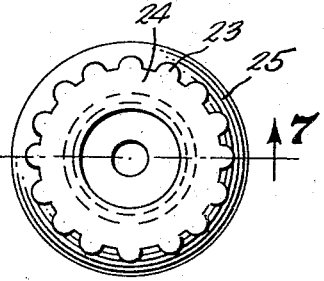
FIGURE 6 is a top plan view of the teat cup inflation of FIGURE 5.

Referring to FIGURES 5, 6 and 7, there is shown an anti-creep adapter designed for use with a dome type teat cup inflation. The adapter is functionally and structurally the same as the embodiment of the invention shown in FIGURES 1–4, except that the peripheral portion 23 of the top flange 24, FIGURES 5 and 7, is slightly convex so as to conform with the curvature of the skirt portion 25 of the inflation. The anti-creep adapter 13', FIGURES 8 and 9, is designed for use with a teat cup inflation having a concave top portion 26. This adapter is functionally and structurally the same as the arrangements previously described, but differing therefrom in that the curvature of the dished portion 27 of the top flange 28 is complementary to the dished top portion 26 of the inflation. The purpose of the dished arrangement is to accommodate the lower portion of the udder 22 in the vicinity of the teat root and relieve any undue pressure thereon.

Referring to FIGURES 10 and 11, the anti-creep adapters 13 are formed with tapered bores; in FIGURE 10 the central bore 15 is downwardly tapered, and in FIGURE 11 the bore is upwardly tapered, as shown. It was found that an adapter having the smaller bore diameter in the top flange 16, FIGURE 11, showed a marked tendency to adhere to the teat with greater tenacity than one with the larger bore diameter in the upper flange, or with an adapter having a bore of uniform diameter.

When adapters having downwardly tapered bores are employed, equal contact is had with all portions of the teat within the bore, but adherence to the teat is less tenacious. As a result, the rapidity with which the cow is milked, optimum time being approximately three minutes, and the accompanying shrinking of the teat itself as the milking progresses, would make drop-off of the milking assembly from the cow practically automatic, thus preventing over-milking. In this connection, since the anti-creep feature is one of the principal features of the adapter, the tenacity of adherence which aids in vacuum sealing the teat and the inflation, might have to be at least partly sacrificed to achieve desired drop-off of the milking assembly. The choice for optimum performance in this regard, lies with a downwardly tapered bore of substantially three degrees.

The anti-creeping feature of the adapters of the present invention will eliminate the need for weighting the teat cup assembly, and lessen the need for movement of the surcingle, in the event that such device is used, along the back of the cow forwardly thereof. The anti-creep feature will also prevent the lower end of the teat from being forced down into the base position of the body of the inflation, thus shutting off the flow of milk into the milk line or receptacle, by damming up the milk in the teat, with no means for it to escape. In cases where cows with extra long teats are found in a herd, their milking will present no problem provided that adapters, in accordance with the present invention, having relatively long necks are employed, in order to lengthen the conventional inflations. It will further be appreciated that with cows which have just freshened or calved, and their teats are therefore distended, particularly circumferentially, an adapter having a bore of larger diameter than the animal usually takes can be inserted in the inflation regularly used, until the distention disappears.

As mentioned hereinbefore, the improved anti-creep adapters are designed for ready attachment to and removal from the teat receiving opening of a conventional inflation, without loosening or removing the inflation from its associated shell. Assuming that a selected inflation 4, FIGURE 3, has been placed in the operative position within the shell 2, the adapter 13 is secured to the inflation by partially inserting the notched portion 18 of the peripheral flange 17 through the normal teat receiving opening 8 in the flange 7 of the inflation, with a slight turning motion, so as to pick up the inner rim or edge 9' of the inflation; a clockwise half-turn will then completely seat the adapter. The sight opening 20 in the top flange of the adapter enables the herdsman to determine the position of the notched portion of the lower flange when inserting the adapter, and it also indicates the exact place to apply a pull, while turning the adapter in a counter-clockwise direction, through approximately one-quarter turn, to easily and quickly remove the adjuster.

The adapters of the present invention are unique, in that sets thereof having small, medium or large bores may all be used with equal ease on inflations having top openings of the same inside diameter. Similarly, inflations having top openings of different inside diameters will receive with equal ease adapters of the same single inside diameter. In other words, as far as bore is concerned, all adapters and all conventional inflations are interchangeable, and the change may be made at any time, either before, during or after herd milking, and without loosening or removing the inflation from its associated shell. It has been found that the time required to remove four adapters from a fully assembled milking machine and insert four different adapters is less than one minute.

The improved adapter makes it possible to "custom-milk" cows by using a device on each milking machine which fits with exactness, the teats of each particular cow in the herd. In order to minimize possible injury to the teats due to abrasion, and to make the adapter more comfortable for the cow, the inner rims of the top and bottom flanges are radiused as at 29, 29' respectively, to remove sharp edges. As the herdsman moves from cow to cow, he can instantly recognize which size of adapter will be needed for each particular cow, and can easily and quickly insert an adapter of desired size. To assist him in immediately choosing the adapter of proper bore, it is contemplated that the adapters will be of different colors for bores of different diameters.

By way of summary, use of the anti-creep adapters of the present invention will accelerate milk let-down, and the cow will milk out more quickly, particularly if she has heretofore been in the habit of unduly prolonging the milking procedure; they enable complete and quicker milking, assist in preventing over-milking, thus reducing the incidence of mastitis; and their use will appreciably increase milk production.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. An anti-creep adapter for use with teat cup inflations of the character having a teat receiving opening in one end thereof incorporating an inturned flange formed with a relatively arrow peripheral edge, said anti-creep adapter comprising a cylindrical-shaped body portion having a central bore, said body portion terminating in an outwardly extending flange at each end thereof, one of the flanges constituting the head portion and the other flange constituting the foot portion of the adapter, said foot portion of the adapter being readily insertable into operative position within the teat receiving opening of the inflation and removable therefrom in situ, the peripheral edge of the inturned flange being in sealing engagement with the peripheral surface of the body portion of the adapter when the foot portion is in the operative position, said inturned flange being spaced from the outwardly extending flanges constituting the head and foot portions of the adapter, whereby vertical movement of the peripheral edge of the inturned flange with respect to the body portion of the adapter is restricted to the distance between the flanges constituting said head and foot portions, thereby maintaining the peripheral edge of the inturned flange out of contact with the upper portion of a cow's teat in the vicinity of the root or juncture with the udder and to thus prevent radial pressure developed in the inturned flange, which pressure would be traumatic to the secretory milk tissue, from being transmitted to the teat.

2. An anti-creep adapter in accordance with claim 1 formed from a plastic characterized by its relatively low coefficient of friction and anti-stick properties.

3. An anti-creep adapter in accordance with claim 2 wherein the plastic is Teflon.

4. An anti-creep adapter in accordance with claim 1, wherein the central bore of the cylindrical body portion is tapered.

5. An anti-creep adapter in accordance with claim 1, wherein the flange constituting the foot portion is formed with a peripheral notch defining at least one angularly disposed lip adapted for cooperative engagement with the peripheral edge of the inturned flange of the inflation, whereby to permit ready insertion of the foot portion into the teat receiving opening of the inflation and removal therefrom.

6. An anti-creep adapter in accordance with claim 5, wherein the flange constituting the head portion is formed with a slight opening in radial alignment with the peripheral notch in the foot portion, whereby to visually determine the location of the peripheral notch when the adapter is in seated, operative position in the teat receiving opening of the inflation.

7. A teat cup for use with cow milking machines, comprising a flexible inflation having a teat receiving opening at one end thereof, an external collar formed on the teat receiving end of the inflation adapted to seat on an end portion of a rigid teat cup shell, said external collar incorporating an inturned flange having a relatively narrow peripheral edge, a rigid teat cup shell surrounding the inflation, the collar formed on the teat receiving end of the inflation being seated on the end portion of the shell, an anti-creep adapter formed from a plastic characterized by its relatively low coefficient of friction and anti-stick properties, said anti-creep adapter being constructed and arranged to prevent upward movement of the inflation on the teat of a cow during the milking process and to thereby interfere with normal flow of milk; comprising a cylindrical shaped body having a central bore, said cylindrical shaped body terminating in an outwardly extending circular flange at each end thereof, one of the flanges constituting the head portion and the other flange constituting the foot portion of the adapter, the flange constituting the head portion being of larger diameter than the flange constituting the foot portion, the flange constituting the foot portion having means formed therewith adapted for cooperative engagement with the peripheral edge of the inturned flange of the inflation, whereby to permit ready insertion and removal of the foot portion of the adapter from the teat receiving opening of the inflation, in situ.

8. A teat cup for use with cow milking machines in accordance with claim 7, wherein the plastic is Teflon.

9. A teat cup for use with cow milking machines in accordance with claim 7, wherein the means formed with the flange constituting the foot portion comprises a peripheral notch having at least one angularly disposed lip.

References Cited

UNITED STATES PATENTS

| | | | |
|---|---|---|---|
| 1,460,977 | 7/1923 | Aden et al. | 119—14.53 |
| 2,687,112 | 8/1954 | Shurts | 119—14.49 |

FOREIGN PATENTS 331,297  7/1930  Great Britain.

SAMUEL KOREN, *Primary Examiner.*

HUGH R. CHAMBLEE, *Examiner.*